United States Patent [19]

Rader

[11] 4,383,259

[45] May 10, 1983

[54] MARINE NAVIGATIONAL AID

[75] Inventor: Carl J. Rader, Coconut Creek, Fla.

[73] Assignee: World Navigation Electronics Inc., Coconut Creek, Fla.

[21] Appl. No.: 209,821

[22] Filed: Nov. 24, 1980

[51] Int. Cl.³ .............................................. G01S 1/24
[52] U.S. Cl. ................................................ 343/103
[58] Field of Search ............... 343/103; 364/452, 434; 250/231 R

[56] References Cited

U.S. PATENT DOCUMENTS 2,991,011 7/1961 Schuck ................................ 364/452
3,737,635 6/1973 Hastings ............................. 364/452
3,947,849 3/1976 Fehlner et al. ..................... 343/103

OTHER PUBLICATIONS

Loran C, User Handbook, Aug., 1974, C. G.-462 Department of Transportation Coast Guard.
Popular Science Magazine, Aug. 1980, pp. 76-78, Times Morror Magazines, Inc., 380 Madison Avenue, New York, N.Y. 11017
Electra Yacht Marine Electronics Handbook, 1980/1981, Electra Yacht, Inc., 6 Yacht Haven Marine Center, Stanford, Conn., 06902.
"The TI9900 Fully Automatic, Computer-Controlled Loran C Navigator", Texas Instruments, Inc.
"Wesmar AP1100 Autopilot", Wesmar Marine Systems Division, 905 Dexter Avenue North, Box C19074, Seattle, Wash. 98109.
"Micrologic ML-120 Loran C Receiver" Micrologic 20801 Dearborn, Chatsworth, CA, 91311.
"Product Information-Simrad-Simrad CC-2 Navigation Computer", Simrad, Inc., One Labriola Court, Armonk, N.Y., 10504.
"Benmar's Course Setter 21 Series", Benmar, Division of Cetec Corporation, 3000 West Warner Avenue, Santa Ana, Calif., 92704.
"Wesmar Automatic Loran C Navigator-Autopilot Course Correction Interface", Wesmar Marine Systems Division, 905 Dexter Avenue North, Box C19074, Seattle, Wash., 98109.
"Microprocessor Northstar 6000" (Automatic Loran C Receiver), Digital Marine Electronics Corporation, Civil Air Terminal, Bedford, Mass., 01730.

Primary Examiner—Theodore M. Blum
Attorney, Agent, or Firm—Richard M. Saccocio

[57] ABSTRACT

Navigational apparatus adapted for interfacing between a Loran C receiver and an auto pilot is disclosed. The apparatus includes a reader for reading course error which is displayed on the readout panel of the receiver, a controller for inputting control signals to a vessel's auto pilot, which control signals direct the auto pilot to sheet straight ahead, correct left or correct right, and a computer for activating the controller in accordance with the data sensed by the reader. An audible alarm is included to alert a vessel's captain of a malfunction or an extreme off-course error so that the captain can manually effectuate any necessary corrective actions.

21 Claims, 8 Drawing Figures

MARINE NAVIGATIONAL AID

BACKGROUND OF THE INVENTION

1. Field of the Invention

This invention relates, in general, to the field of marine navigational devices, and in particular, to navigational apparatus which interfaces with a vessel's hyperbolic radionavigational receiver and its auto pilot.

2. Description of the Prior Art

To steer a course in order to arrive at a predetermined distant location has long been the nemesis of marine navigators. Christopher Columbus's navigational error in discovering the "new world" when, in fact, he was seeking a better route to the orient is perhaps the foremost example of such errors. Needless to say, navigational errors have caused problems which at one extreme include the loss of lives and at the other extreme include minor irritations to a recreation-seeking boater, such as missing the island of Bimini.

Beacuse of relatively recent technological advances, navigational errors of the past are no longer a problem for a properly equipped vessel. Modern day navigational aids utilizing long Range Aid to Navigator—Loran C—enable a boater to repeatedly arrive at a predetermined distant location, within a few feet thereof. Hence, navigational errors are now measured in feet rather than miles, or even hundreds of miles.

The predecessor of Loran C, Loran A, was developed during the Second World War at the Massachusetts Institute of Technology. While the initial implementation of the system was to fulfill wartime needs, it is now used by civilians as well as the military. The Loran system utilizes land-based transmitters in conjunction with onboard receivers. Each of at least two transmitters, transmits pulsed, low frequency (100 kHz) radio waves. At any given vessel position, the location of that position is a function of the distance between the vessel and each of the two transmitters. The difference in distance is in turn a function of the time difference between signals from each transmitter to the vessel. The difference in distance will lie along a hyperbolic line comprising the locus of all positions having exactly the same time difference between the times of arrival of the signals from the transmitters to the vessel. The hyperbolic line is uniformly referred to as a line of position—LOP. Since only one LOP has been established, the vessel's position has not yet been fixed. It is only known that the vessel's position is somewhere along this particular LOP.

To fully fix the vessel's position, another set of transmitters are used. In the same manner as described above, a second LOP is established. The vessel's exact position is at the intersection of the two LOPs. In practice, three, rather than four, transmitters are used. One of the transmitters being common to each set of two transmitters.

The U.S. Coast Guard is currently responsible for operation of the LORAN C system. As previously mentioned, the LORAN C is a much improved version of its predecessor, the LORAN A system. In 1974, eight LORAN C chains were in operation, which included the use of thirty-one transmitting stations in providing coverage for over sixteen million square miles. The coverage is ultimately planned to include the entire U.S. Coastal Confluence Zone and a large portion of the northern hemisphere.

For a fuller description and explanation of the LORAN C system, reference may be had to the following publications. LORAN C, User Handbook, August, 1974, C.G.—462 Department of Transportation—Coast Guard. Popular Science Magazine, August, 1980, pp 76-78; Times Mirror Magazines, Inc.; Electra Yacht Marine Electronics Handbook, 1980/1981, Electra Yacht, Inc., 6 Yacht Haven Marine Center, Stanford, Connecticut, 06902.

As mentioned, the LORAN C system is used by navigators having onboard receivers specifically designed to receive the signals transmitted at approximately 100 kHz. There are numerous, very sophisticated and fairly inexpensive receivers on today's market. The Electra Yacht publication, above, pictorially illustrates and lists the specifications and options of some of the more commonly-used receivers. In general, the receivers will visually show, by use of a light-emitting diode display, the LOPs of a particular position of the vessel. Having this information, the navigator merely refers to LOP charts to fix his position. The receivers will also convert from a LOP position to a latitude-longitude position. Perhaps one of the more important features of most if not all the receivers is the steer function. The steer function allows a navigator to steer a course along any LORAN C chart line. A steer-computed line function allows a navigator to steer along any straight line course. This latter function enables a navigator to steer along the straight line between the point of origin and the desired point of destination. Again, in general, this is accomplished by first determining the vessel's position in terms of intersecting LOPs. Then, the destination LOP's are determined from an appropriate chart. These data are then input into the receiver and the navigator turns the vessel and rudder in an approximate direction to the destination. The receiver will then visually display a vertical bar or bars of light which will be centered along the horizontal display when the vessel is exactly on course. The vertical bar will move in incremental steps to the left or the right depending upon whether the vessel is off course to the left or the right, respectively. The further the vessel is off course, the further the vertical bar will be to the left or the right on the display panel. Typically, one increment represents an off course error of 0.1 microsecond, corresponding to an error of 50 feet. Thus, if the bar of light is three increments to the right, the vessel is 150 feet off course to the right. To put the vessel back on course, it is steered to the left until such time as the bar of light is again at the center of the display console. In actual practice, steering a course by use of the LORAN C display results in the vessel making a series of large "S" curves as the vessel tracks back and forth across the computed steer line.

It should be noted that steering a computed course is totally independent of winds, currents and compass errors. In fact, a compass reading is not even needed. This is not, however, to say that a LORAN C receiver replaces a compass. It is supplemental thereto.

An auto pilot is another navigational device which has long been known to be a steering aid to ship's captains. Auto pilots, of course, automatically steer a vessel along a desired magnetic bearing. Such devices, however, are not as accurate as steering along a LORAN C computed steer line. This is because a magnetic bearing does not account for a vessel's drifting due to currents, wind, or tide. Still, for many navigational purposes, an auto pilot is a very useful device.

A very sophisticated system is obtained with a LORAN C receiver is integrated with an auto pilot. Instead of a magnetic input, however, the LORAN C computed steer line comprises the direction that the auto pilot maintains. With such a system, a vessel's captain need only be concerned with avoiding unforeseen obstacles such as other vessels, low water, uncharted islands, localized thunderstorms, and the like. The advantages of such a system are immense. Human error is virtually eliminated. Missing a point of destination is all but impossible. Indeed, if the ships of Christopher Columbus were equipped with a LORAN C receiver and an integrated auto pilot, he would have had to become famous for reasons other than for his fortuitous navigational miscalculation.

Many of today's sea-going vessels are equipped with an auto pilot and a separate LORAN C receiver. The invention herein is intended to interface with these devices and thereby provide the benefits of a combined receiver and auto pilot. The invention is intended to provide this advantage without the need to replace either the LORAN C receiver or the auto pilot. Moreover, the invention is intended to provide this advantage with a minimum of cost and simplicity of installation.

Accordingly, an object of the present invention is to provide apparatus which interfaces with existing LORAN C receivers and auto pilots to provide automatic steering in accordance with a LORAN C steer line—either a computed steer line or a charted steer line.

Another object of the present invention is to provide interfacing apparatus which allows for extremely simple connection to an existing LORAN C receiver and to an existing auto pilot.

A further object of this invention is to provide apparatus having the advantages of an integrated LORAN C receiver and auto pilot at a fraction of the cost thereof.

BRIEF SUMMARY OF THE INVENTION

In accordance with the above objectives, the present invention comprises apparatus which interfaces with a LORAN C receiver having visual steering line indicator readout and a magnetically controlled auto pilot. The apparatus includes a reader for reading the steering line indicator readout of a LORAN C receiver, a binnacle flux controller for supplying magnetic signals which are input to an auto pilot and electronic circuitry for converting the steering line indicator readout into the magnetic signal input to the auto pilot.

The reader includes a plurality of light-sensitive devices which are arranged to be activated in accordance with the receiver steering line readout. Thus, the reader reads the then existing steering line position which indicates whether the vessel is on course or off course, and if the latter, by how much it is off course and in which direction. When the vessel is on course, a neutral magnetic coil in conjunction with the auto pilot maintains the vessel in a pre-established bearing. When the vessel is off course, either to the left or right of the pre-established bearing, an appropriate left or right magnetic coil is activated which directs the auto pilot to steer in a correcting direction. The vessel direction is thus altered until such time as the LORAN C receiver indicates that the vessel is again on course, at which time the neutral magnetic coil again maintains the vessel in the pre-established on course direction.

The inventive apparatus further includes an alarm system, comprising an audible signal, which is activated upon the occurrence of either the vessel going off course by more than a predetermined distance or if the LORAN C readout signal is lost.

BRIEF DESCRIPTION OF THE DRAWINGS

For a more complete understanding of the invention, reference is had to the following description taken in conjunction with the following drawings, in which.

DESCRIPTION OF THE PREFERRED EMBODIMENTS

Figure 1:
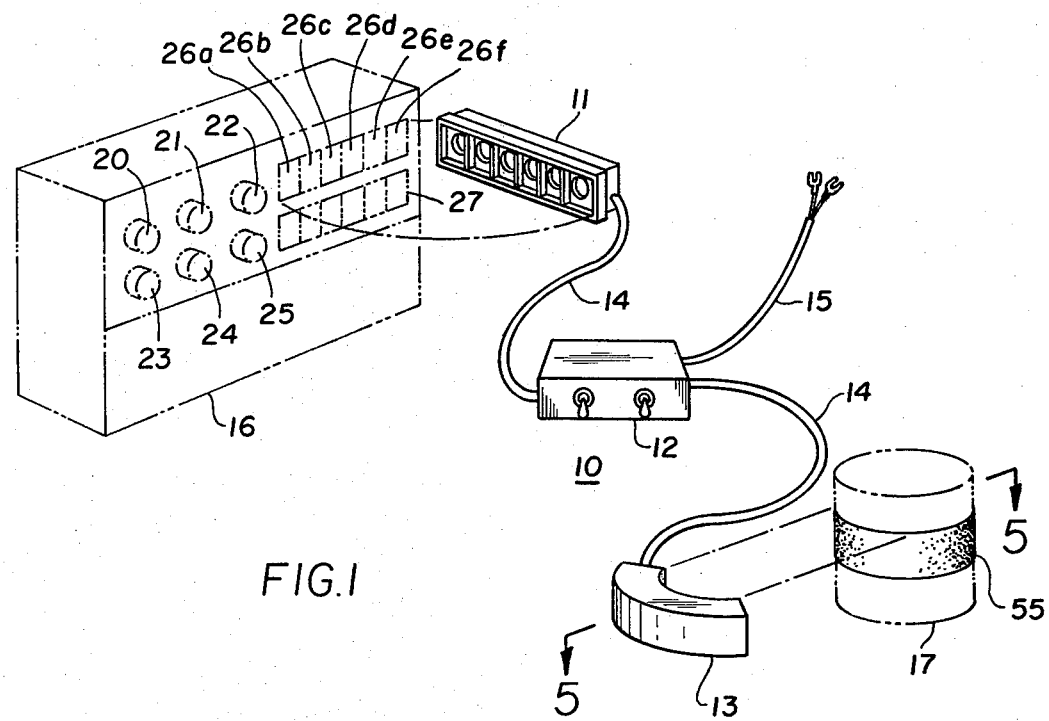
FIG. 1 is an isometric schematic view of the component parts of the inventive apparatus adapted to be used with a LORAN C receiver and a magnetic compass of an auto pilot, the latter of which are shown in phantom, and illustrating the interfacing of the inventive apparatus with the receiver and the auto pilot.

Referring now to FIG. 1 of the drawings, the inventive apparatus is generally designated by the number 10 and comprises a reader 11, an electronic controller 12, a binnacle flux controller 13, interconnecting wiring 14, and power input wiring 15. A typical LORAN C receiver is designated by the numeral 16; while a typical magnetic compass, or binnacle, of an auto pilot is designated by the numeral 17. It is to be noted that the inventive apparatus 10 is intended to interface with receiver 16 and binnacle 17. Neither receiver 16 nor binnacle 17 form part of the inventive apparatus. The following description is to be viewed with regard to such typical instruments as are currently available. And, although the instruments may vary from manufacturer to manufacturer, the variations are inconsequential to the inventive apparatus described herein. Therefore, slight design changes may be required of the reader 11 and the binnacle flux controller 13 to properly interface with the different instruments that are in use today; but, the design changes would be readily apparent to an ordinarily skilled person following the teachings of this invention.

A current state of the art LORAN C automatic receiver is the MICROPROCESSOR NORTHSTAR 6000 produced by the Digital Marine Electronics Corporation, Civil Air Terminal, Bedford, Mass., 01730. In general, a LORAN C receiver has a data display panel utilizing LED readouts. The functions displayed on the readout panel include time delay, steer line of position, steer line of position reversed, signal to noise ratio, and mode.

In FIG. 1, function switches 21 and 24 control the type of data displayed on readout panels 26 and 27, respectively. Switch 20 provides for power on and off; while switch 23 provides for dimming the brightness of the LED display. Switches 22 and 25 are transmitter selector switches which are electronically connected to readout panels 26 and 27, respectively. Sophisticated receivers such as the NORTHSTAR 6000 provide for simultaneous tracking of a master and five slave transmitters by the use of switches 22 and 25. Double readout panels 26 and 27 allow for visual display of intersecting LOPs for the exact fixing of a vessel's position or destination.

A time delay function displays the numerical value of TD lines (LOPs) of a LORAN transmitter chain which is published in chart form. By correlating the displayed TD line numbers with the LORAN charts, the exact position of the vessel is determined. A steer line of position function allows a receiver to be used as a navigational aid in steering a course along a selected LORAN C line. This function displays the time differential between an initial TD reading (when the course is set) and a present TD reading (present course). This time differential is expressed in tenth's of a microsecond (one microsecond is one millionth of a second). Since each tenth of a microsecond corresponds to a distance of fifty feet, the distance in feet the vessel is off course from the initially established course is simply the number of tenths times fifty. Most receivers do not display the time differential in numbers, instead a vertical bar of light is used. When the bar is in the center of the display panel 26, the vessel is on course. When the bar is one increment to the left of center, the vessel is off course fifty feet to the left. The same is true when the vessel is off course to the right. When the vessel is considerably off course, either to the left or the right, a visual warning will be indicated on display panel 26.

Another function which may be included in a LORAN C receiver is a steer-computed line function. This function allows a receiver to be used as a navigational aid in steering a course along any straight line between any two points on a LORAN chart. It is not restricted to a LORAN C line. This function allows a vessel to be navigated along a straight line between a point of origin and the point of destination or between the point of origin and any intermediate point of destination. Whether the vessel is on or off course is displayed on the LORAN C receiver as noted above.

The inventive apparatus 10 is intended to be used with the on or off course indication displayed on a readout panel of a LORAN C receiver such as that designated by the numeral 26. Thus, the inventive apparatus 10 can be used to steer a course along a predetermined LORAN C line (steer LOP function) or along a course represented by a line between any two points on a LORAN C chart (steer-computed line function). However, instead of a vessel's captain reading the course error and making manual steering corrections, the reader 11 of the inventive apparatus 10 reads the course error. This information is input to electronic controller 12 where it is analyzed. Output signals from electronic controller 12 are then input to binnacle flux controller 13 which in conjunction with a vessel's auto pilot makes any necessary corrections in the vessel's course.

Figure 3:
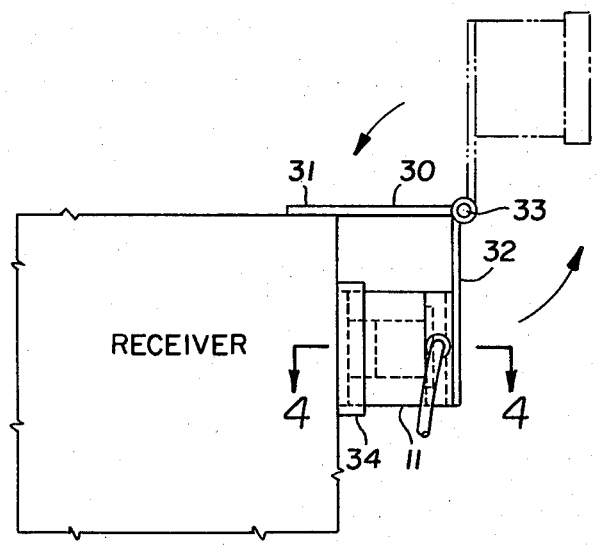
FIG. 3 illustrates one method of securing the reader portion of the inventive apparatus to a LORAN C receiver.
Figure 4:
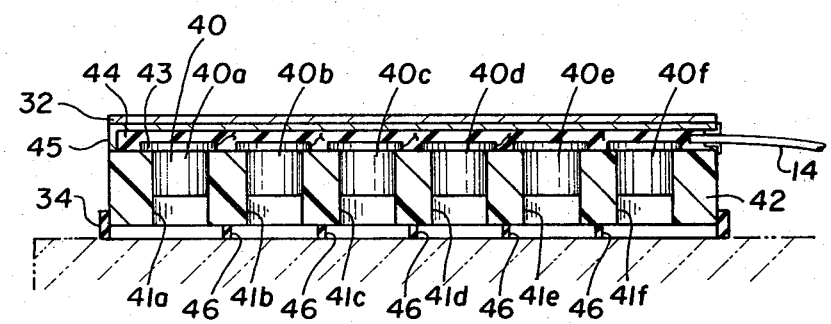
FIG. 4 is a cross-sectional view taken along the line 4—4 of the reader of FIG. 3, illustrating one method of mounting and assembling the component parts of the reader portion of the inventive apparatus.

Reader 11, which as previously stated, is intended to interface with a LORAN C receiver which in FIG. 1 is identified by the numeral 16. One method of attaching reader 11 to receiver 16 is shown in FIG. 3 and FIG. 4. It is important that reader 16 be fixed positively relative to the readout panel 26 of receiver 16. The fixation must be such that the vessel's motion and pounding received by waves and swells does not cause movement of reader 11 relative to readout panel 26. Any such movement will cause or result in error in the operation of the inventive apparatus 10. It is not necessary, however, that reader 11 be permanently positioned against readout panel 26. In fact, it is beneficial that reader 11 can be moved away from readout panel 26 when the inventive apparatus is not in use. This will allow a receiver 16 to perform its other functions without interference of the inventive apparatus 10.

In FIG. 3, a hinge 30 provides the requisite aspects of the above-described attachment. Leaf 31 of hinge 30 is fixedly attached to the cabinet of receiver 16. Screws (not shown) or other conventional fastening means may be used. Similarly, reader 11 is fixedly attached by conventional fasteners, such as screws, to leaf 32. This shown and described method of attachment allows for the reader 11 to be firmly positioned against a receiver 16 readout panel 26 when the inventive apparatus is in use; and, when not in use, allows the reader 11 to be pivoted away from the readout panel 26 by rotating leaf 32 relative to leaf 31 on hinge pin 33. In FIG. 3, the position of reader 11 when not in use is shown in phantom. It will be appreciated that the final position of reader 11 will be on top of leaf 31. The friction between leafs 31 and 32 and pin 33 should be such that the vessel's motion does not move reader 11 from either its in-use position or its out-of-use position.

There are, of course, other satisfactory methods of attaching reader 11 to receiver 16 which are within the known art. For example: mating velcro strips, flanged sliding tracks, quick disconnect fasteners, etc.

Still referring to FIG. 3, a light shield 34 surrounds the peripheral surfaces of reader 11 and abuts receiver 16 to prevent any external light source from entering the fit-up between reader 11 and receiver 16. In this manner, reader 11 is exposed only to light emitted from the LEDs of panel 26. External light could adversely affect the reading function of reader 11 and is, therefore, to be avoided.

Reader 11 comprises a plurality of light-sensitive devices such as photocells 40. In the illustrated embodiment, six photocells 40 are used. The number six has been chosen because receivers 16 typically employ six bars of light to the left and six bars to the right of an on-course center position. Each of the photocells 40, therefore, correspond to and are in alignment with two bars of light. When the vessel is on course, one bar of light will be exposed to photocell 40c and one bar of light will be exposed to photocell 40d. When the vessel is off course to the right by 0.1 microsecond (50 feet), only one bar of light will be displayed on readout panel 26 at the position of photocell 40c. Photocell 40c will also be exposed to a bar of light when the vessel is 0.2 microseconds off course to the right. Similarly, photocell 40b is exposed to indications that the vessel is off course to the right by either 0.3 or 0.4 microseconds. And, photocell 40a is exposed to indications that the vessel is off course to the right by 0.5 or 0.6 microseconds. Photocells 40d, 40e, and 40f correspondingly are exposed to indications that the vessel is off course to the left by 0.1 or 0.2, 0.3 or 0.4, and 0.5 or 0.6 microseconds, respectively.

Photocells 40, in the embodiment illustrated, are friction fitted within holes 41 in base 42. A flange 43 on each of the photocells bears against the outboard surface of base 42 so that each photocell is spaced an equal distance from the LED readouts of display panel 26. A cover 45 and a compressible packing material 44 are provided at the outboard surface of base 42 to further contain photocells 40 and to allow for routing of wiring 14. Additional light shielding 46 may be provided between each photocell 40 to eliminate the possibility of anomalous readings.

Figure 5:
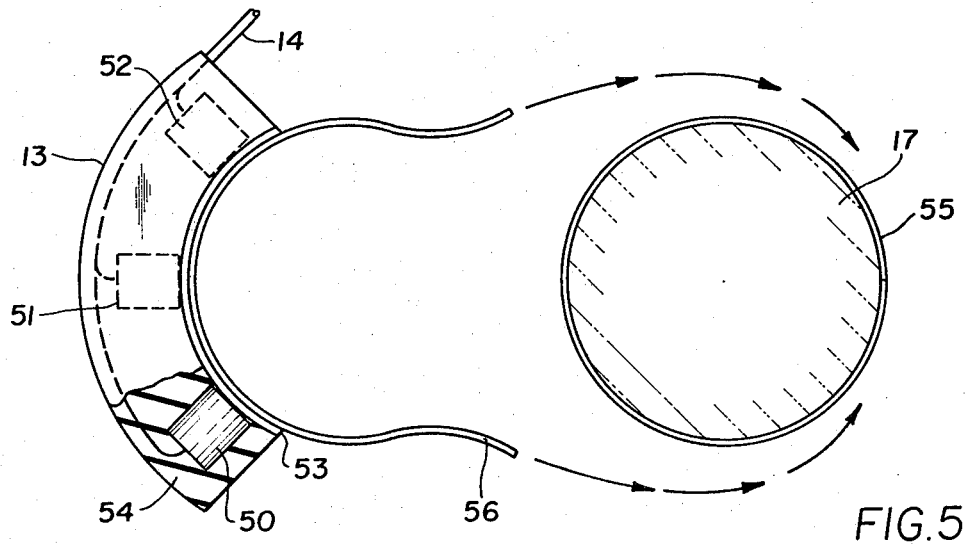
FIG. 5 is a view partially in cross section of the binnacle flux controller of the inventive apparatus illustrating a method of securing the controller to a binnacle of an auto pilot.

Binnacle flux controller 13, as illustrated in FIG. 5, contains three spaced coils 50, 51, and 52 which emit a magnet flux or field when energized. Each of the coils 50, 51, and 52 are attached to a plate 53. An appropriate casting material such as silicon rubber is cast around coils 50, 51, and 52 to form a housing 54 within which the coils 50, 51, and 52 are imbedded. Wiring 14, connected to each coil 50, 51, and 52 may also be cast within housing 54 and exits at a common point on any convenient surface of housing 54. The housing 54 and plate 53 must not be made from materials which are ferrous or possess properties which will attract a magnet or build up residual magnetism. It is also preferable that they be sufficiently flexible so as to allow controller 13 to flex as necessary to snugly fit against and around binnacle 17. Except as noted, the described method of housing coils 50, 51, and 52 is not critical to the invention and that other equally satisfactory methods will be readily apparent to a skilled person.

Since controller 13 is to be adapted to fit and work with various binnacles, the design and location of coils 50, 51, and 52 is critical to proper operation of the inventive apparatus 10. Auto pilots will initiate a corrective-steer function when the vessel is off course by a preselected angular displacement; hence, the "effective" included angle between the center lines of adjacent coils must be equal to or greater than the preselected angular displacement. This is so because if the "effective" coil spacing is less than the minimum necessary to activate a steer-correct function of an auto pilot, the inventive apparatus 10 will not properly operate in steering the vessel.

Figure 2:
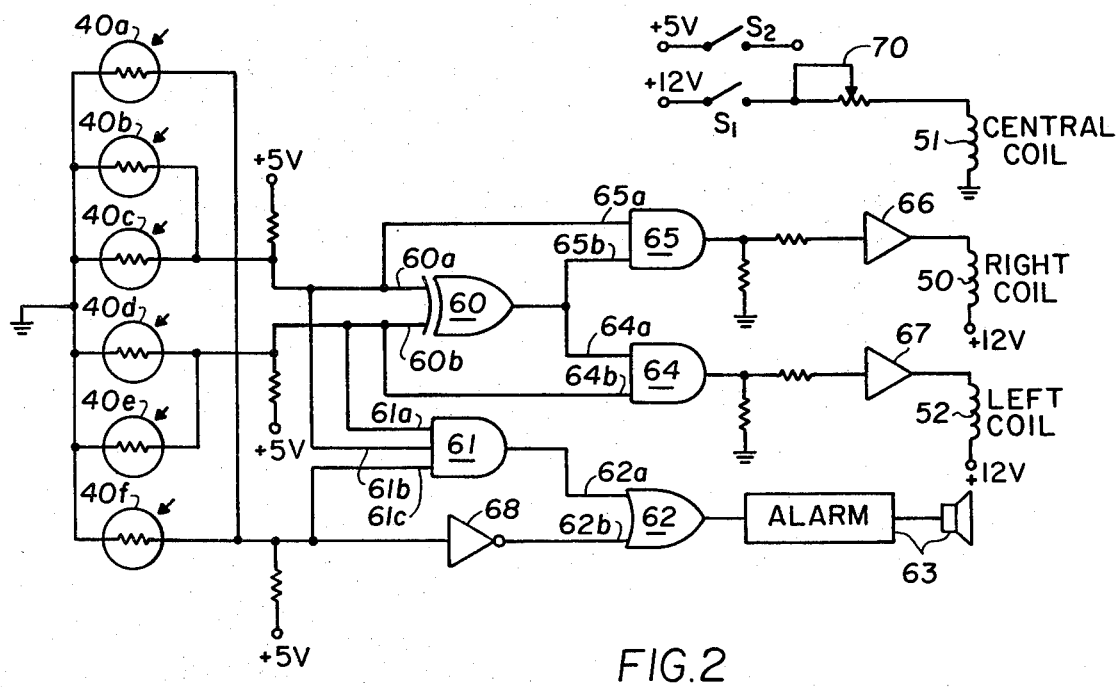
FIG. 2 is a schematic electrical logic diagram of the inventive apparatus.

As will be explained hereinafter, central coil 51 is always activated when apparatus 10 is in operation. The needle of compass 17 will, therefore, point to the location of coil 51. When a right-steer correction is required, right coil 50 and central coil 51 will both be activated. The needle of compass 17 will then point to an intermediate position between coils 50 and 51 depending upon the relative strength of each coil. The angular displacement between the centerline of central coil 51 and the position of the needle of compass 17 between coils 50 and 51 is defined as the "effective" coil spacing. Assuming that coils 50 and 52 have the same strength as they do in the inventive apparatus 10, the effective coil spacing is the same to the left of central coil 51 as it is to the right of central coil 51. In prototype testing of the apparatus 10, it has been been determined that by adjusting the strength of central coil 51, the effective coil spacing can be adjusted as required to activate the corrective-steer function of an auto pilot. A potentiometer 70, as shown in FIG. 2, is provided for this purpose. By adjusting potentiometer 70 to increase the resistance of central coil 51, the strength of central coil 51 decreases relative to right coil 50 and to left coil 52, and the effective right and left coil spacing is thereby increased. Similarly, by lowering the resistance of central coil 51, the effective right and left coil spacing is decreased. In this manner, effective coil spacing as low as 1° and as high as 20° or more can be attained. And, the effective coil spacing can be turned to the particular binnacle being used on a vessel.

Inasmuch as the compass of an auto pilot is positioned on a vessel in a relatively inaccessible place such as the ship's bow, it is highly desirable that flux controller 13 be attached to the compass of an auto pilot whether or not apparatus 10 is in operation. Coils 50, 51, and 52 should, therefore, not affect the normal operation of the compass when apparatus 10 is not in operation. In this regard, coils 50, 51, and 52 are designed so that they exhibit no effective residual magnetism. Typical coil specifications are as follows: core material of each coil—soft iron, approximately one-eighth inch in diameter by one inch long; coil resistance—between 80 to 100 ohms. Coils having these specifications have performed adequately in prototype testing. Other specifications would be apparent to one ordinarily skilled in the art consistent with the teachings disclosed herein.

The controller 13 must also be connected to compass 17 so that the vessel's motion does not disturb its position. In this regard, one half 55 of a mating velcro fastener is attached to compass 17 while the other half 56 is attached to controller 13. As shown in FIG. 1 and FIG. 5, the controller can then be attached to compass 17. Because of the operation of the inventive apparatus 10, the relative rotational position of controller 13 relative to compass 17 is not important. Its axial position relative to compass 17 is important. It must be positioned so that the plane defined by the centerlines of coils 50, 51, and 52 substantially coincides with the horizontal plane of the needle of the compass.

The operative components of reader 11 and binnacle flux controller 13 are schematically shown in FIG. 2 along with the logic components of electronic controller 12 of the inventive apparatus 10. Coils 50, 51, and 52 are powered by 12 vdc and activated by S1. The control logic voltage is 5 vdc and activated by S2.

The corrective-steer functions are electronically connected as follows: Photocells 40b and 40c are connected in parallel; their output is connected to input leg 60a of exclusive OR gate 60. Photocells 40d and 40e are also connected in parallel; their output is connected to input leg 60b of exclusive OR gate 60. AND gate 64 is connected to the output of OR gate 60 and the output of photocells 40d and 40e. AND gate 65 is connected to the output of gate 60 and the output of photocells 40b and 40c. The output of gate 65 is amplified by amplifier 66 and input into coil 50. Similarly, the output of gate 64 is amplified by amplifier 67 and input into coil 52.

The alarm function of apparatus 10 is electronically connected as follows: AND gate 61 has three input legs 61a, 61b, and 61c. These, respectively, are connected to the output of photocells 40d and 40e, 40b and 40c, 40a and 40f. The output of AND gate 61 is input through leg 62a to OR gate 62. The other leg 62b of OR gate 62 is supplied by signals from photocells 40a and 40f through inverter 68. The output of OR gate 62 is supplied to audible alarm 63.

The operation of the inventive apparatus 10 will now be described.

When the vessel is on course, receiver 16 emits two bars of light, one at position 26c and the other at position 26d of display 26. These lights are sensed by photocells 40c and 40d, respectively. Since an exposure to a light decreases the resistance of a photocell, the sensing of light by photocells 40c and 40d causes a low voltage having a logic value of zero to be input to leg 60a, and leg 60b of gate 60. Hence, the output of exclusive OR gate 60 is logic 0. The output of AND gates 65 and 64 is consequently logic 0. Therefore, neither right coil 50 nor left coil 52 is activated. It should be noted that central coil 51 is always activated, the flux field of which is adjusted to a particular auto pilot by adjusting potentiometer 70. The central coil 51 is, therefore, the only coil activated when the vessel is on course. The needle of compass 17 of the auto pilot is then pointed toward the location of coil 51. As far as the auto pilot is concerned, it will steer the vessel as directed by coil 51 unless directed otherwise.

Assume now that the vessel is off course to the left by 0.1 microsecond. A single bar of light will be sensed by photocell 40d. The logic input to gate 60 at leg 60b will be logic 0. The logic input to gate 60 at leg 60a will be logic 1. The output of gate 60 will be logic 1. Accordingly, gate 65 will output logic 1 while gate 64 will output logic 0. The result is that right coil 50 will be activated along with central coil 51. This will direct the needle of compass 17 to a position between central coil 51 and right coil 50. In turn, this will cause the auto pilot to steer in a right direction (assuming that the pointing of the compass 17 toward the right coil results in a right rudder).

If the vessel is off course to the left by 0.2 microseconds, photocell 40d will again sense the off-course direction and electronic controller 12 will again direct the auto pilot to steer to the right in the manner described above. When the steering corrections are made, the vessel will reach a point where it is off course by only 0.1 microsecond. The same photocell, 40d, will still sense an off course direction to the left and the inventive apparatus 10 will continue making a steering correction to the right. Thus, in the illustrated embodiment, photocell 40d initiates a steering correction to the right when the vessel is off course to the left by either 0.1 or 0.2 microseconds.

By similar reasoning, photocell 40c will initiate steering corrections when the vessel is off course to the right by either 0.1 or 0.2 microseconds. The steering correction will, of course, in this case, be to the left and will be accomplished by the activation of the left coil 52 in combination with central coil 51.

Assume now that the vessel is off course to the right by either 0.3 or 0.4 microseconds. The display 26 of receiver 16 will show a bar of light either to the left of center of position 26e or the right of center of position 26e, respectively. Either of these bars will be sensed by photocell 40b. The decrease in resistance of this photocell will input a logic 0 at leg 60a of gate 60. Since photocells 40d through 40f sense nothing, a logic 1 will be input at leg 60b. The output signal of gate 60 will thus be a logic 1 which is input to legs 65b and 64a. Because leg 65a is common to leg 60a, a logic 0 will be input to leg 65a. Similarly, a logic 1 will be input to leg 64b. Gate 64 will output a logic 1 activating left coil 52. The vessel will then be steered to the left to correct for the vessel being off course to the right. As the course direction of the vessel is corrected to the left, it will reach a position where it is off course by only 0.1 to 0.2 microseconds. At this point, photocell 40c takes over from 40b but continues to correct the vessel's course to the left. When the vessel is back on course, photocells 40c and 40d take over and, as previously explained, only central coil 51 is activated, which again maintains the vessel in an on-course direction (straight rudder).

The functioning of photocell 40e is similar to that of 40b except that the directions of course error and correction are reversed.

If the vessel is off course by 0.5 or more microseconds, the error will be sensed by either photocell 40a or 40f. The functioning and effect of these photocells is similar. Assume then that the off course direction is to the left, in which case photocell 40f senses the error. In accordance with the previously explained occurances, neither left coil 52 nor right coil 50 will be activated. AND gate 61 will have logic 1s input at legs 61a and 61b, a logic 0 at input leg 61c, and will output a logic 0. A logic 0 will be input to inverter 68 which will output a logic 1. OR gate 62 will thus output a logic 1 or positive impulse which will activate audible alarm 63. The audible alarm will alert the vessel's captain so that he may make manual adjustments in the vessel's attitude, as are necessary. By similar reasoning, alarm 63 will be activated when all the bars of light on display panel 26 are lighted (malfunction), when no lights are displayed on panel 26 (malfunction), or when a bar of light is displayed at position 26f of display panel 26.

Having fundamentally described the inventive apparatus 10, a few observations including other embodiments and notations are in order.

Most LORAN C receivers in use today utilize some form of visual display to indicate that a vessel is on or off course and in which direction it is off course. A majority of these display a central (on-course indication) position and three positions to the left or right (off-course indications). The NORTHSTAR 6000 receiver subdivides each right or left position by two so that up to 0.6 microseconds left or right is displayed in single increments. The above illustrated and described embodiment will perfectly interface with these receivers. The centerline spacing of photocells 40 is, of course, important to the proper functioning of the inventive apparatus 10 and may have to be tailored to particular receivers.

The minority of today's receivers which use a different visual display indicating course error do utilize some method of visually indicating whether the vessel is off course to the left or to the right. With these receivers, the visual indication is by some lighted symbol either on the right or the left of the display panel. By tailoring the centerline distance and the number of photocells, the inventive apparatus 10 will again provide the described steering corrections.

Figure 6:
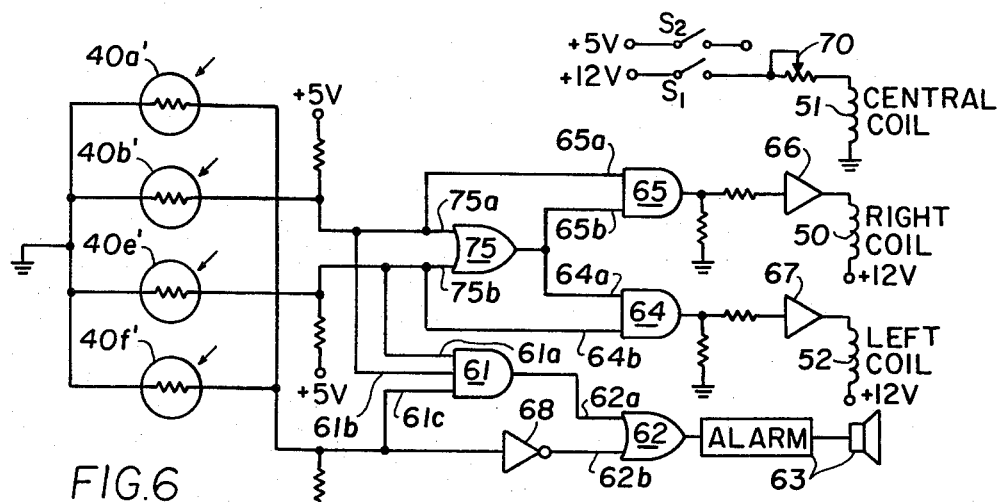
FIG. 6 illustrates another embodiment of the inventive apparatus.

For example, assume that a receiver displays a single bar of light at its centermost position to indicate the vessel is on course. And, a single bar of light is displayed to the left of center indicating the vessel is off course to the left. Similarly, with a right bar of light. Now, referring to FIG. 6, two photocells $40b^1$ and $40e^1$ would be used in reader 11 for course correction. The location of each photocell being aligned with the right and left off-course lights displayed by the receiver. In place of the exclusive OR gate 60 in FIG. 2, a simple OR gate 75 would be used, with the corrections as shown in FIG. 6. It is to be noted that FIG. 6 is the same as FIG. 2 except that photocells 40c and 40d are not used and gate 60 is replaced by gate 75.

When the vessel is on course, central coil 51 maintains the course position. When the vessel is off course to the left, photocell $40e^1$ senses this. Accordingly, right coil 50 is activated, steering the vessel in that correcting direction. Similarly, if the vessel is off course to the right, left coil 52 will be activated, steering the vessel in that correcting direction. The alarm logic of FIG. 2 applies to the embodiment shown in FIG. 6.

Figure 7:
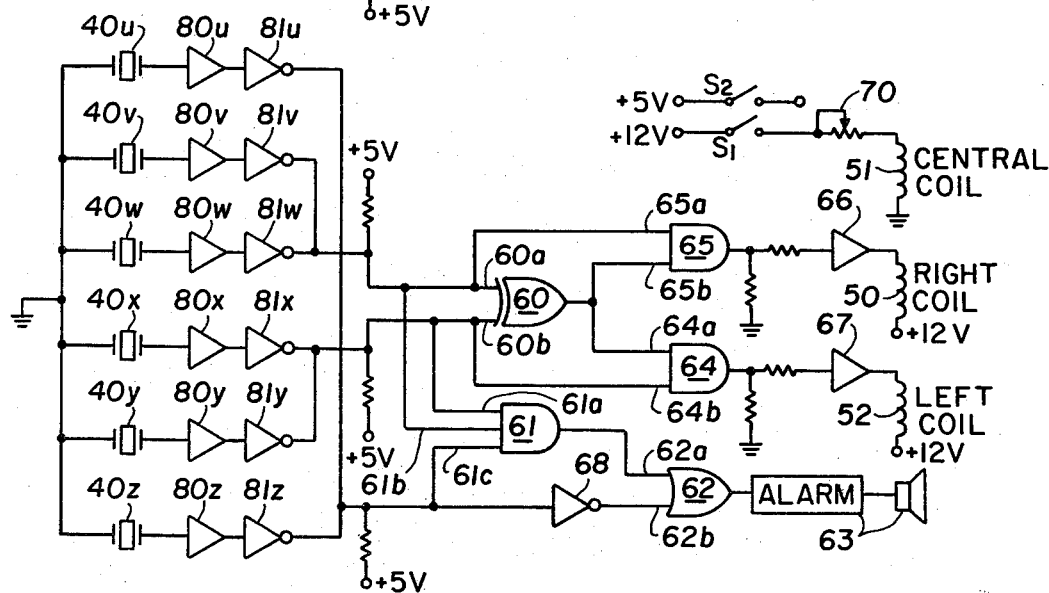
FIG. 7 illustrates still another embodiment of the inventive apparatus.

For receivers 16 utilizing an LCD display rather than an LED display, the embodiment shown in FIG. 7 is applicable. This embodiment is intended to interfere with a receiver such as the NORTHSTAR 6000 having an LCD display. In place of photocells 40a through 40f, electrode pairs 40u through 40z are used. Since LCDs became solid (visible) when a voltage is applied, an electrostatic field is created by the voltage. This electrostatic field is sensed by a pair of spaced electrodes when an electrode pair is placed adjacent to an LCD. Thus, a spaced electrode pair will read a visible LCD much the same as a photocell will read a visible LED. Amplifiers 80 are used to amplify the sensed reading from an electrode pair. And, in order to utilize the same logic circuitry of the LED embodiment, inverters 81 are used. The embodiment shown in FIG. 7 will operate in the same manner as the embodiment shown in FIG. 2.

Figure 8:
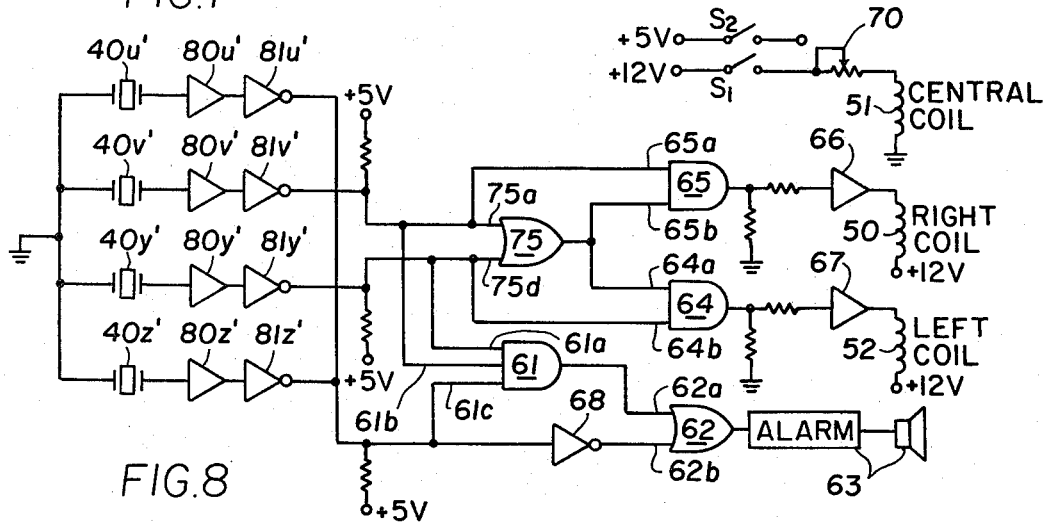
FIG. 8 illustrates still another embodiment of the inventive apparatus.

The embodiment shown in FIG. 8 is similar in operation to the embodiment shown in FIG. 6, but the photocells 40a', 40b', 40e', and 40f' have been replaced by electrode pairs 40u', 40v', 40y', and 40z' plus corresponding amplifiers 80u', 80v', 80y', and 80z', and inverters 81u', 81v', 81y', and 81z'.

The inventive apparatus 10 is also adaptable to substantially all the auto pilots in use today. The operative effect of controller 13 will be in accordance with the type of auto pilot being used. When used with a "hunting" auto pilot, right coil 50 and left coil 52, when activated, will steer the vessel right and left, respectively, through a small angle. The result will be that the vessel zigzags back and forth across the desired heading. The photocells 40 right and left of the center of reader 11 in conjunction with right 50 and left 52 coils will provide the necessary corrections.

When the inventive apparatus 10 is used with the type of auto pilot known as the "nonhunting proportional deadband" type of auto pilot, the following is applicable. The central coil 51 will, in effect, take the place of the deadband within which the helm is inactive. The right 50 and left 52 coils must be spaced outside the deadband limits so that steering corrections can be effected. The proportional aspects of the auto pilot will be negated and the steering correction will be in accordance with the angular position of coils 50 and 52 relative to the compass. Thus, if the effective included angle between coils 50 and 52 is 20°, the auto pilot will initiate a 10° correction.

With the "nonhunting proportional rate" auto pilot, the inventive apparatus 10 will again negate the proportional aspects of the auto pilot. The variable rate of correction aspects of this type of auto pilot will also be overriden. The result will be a steer left or right depending upon how far the vessel is off course and not in which angular direction the vessel is off course.

Thus, while the different types of auto pilots, when used in conjunction with the inventive apparatus 10 will affect the correcting rudder angle, they will all result in a zigzag or "S" type of correction. That is, the vessel will be steered back toward the predetermined steer line, cross over it and then steer in the opposite direction. The result will be similar to the hunting type of steering providing by that type of auto pilot. The effect of the central coil 51 will, however, be to continually reduce the distance the vessel is off course until such time it is back on the desired course.

It will be observed, as previously explained, that the inventive apparatus 10 is completely insensitive to the angular position of controller 13 relative to the compass of an auto pilot. In setting apparatus 10 in operation, the vessel is steered such that the centerline of the vessel and the centerline of the rudder coincide with the preselected steer line. Switch S1 is activated; the auto pilot is activated; then S2 is activated. The flux field of central coil 51 now causes the magnet to point at coil 51. This becomes the exact on-course setting regardless of the numerical reading of the compass. Any deviation left or right of this setting is registered by receiver 16 which is sensed by reader 11. The left or right steering corrections are then effectuated by the electronically-controlled 12 actions of coils 50 or 52.

While the invention has been described, disclosed, illustrated, and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. Apparatus for steering a vessel along a preselected course, said apparatus being adapted to interface with a LORAN C receiver and with an auto pilot, comprising
    means comprising light sensitive apparatus for reading the vessel's position relative to said preselected course, said vessel position being determined and indicated by said receiver,
    means for applying course control signals to said auto pilot,
    means for converting said reading of the vessel's position into said course control signals, and
    means for supplying a source of electric power to said reading means to said means for supplying control signals and to said converting means.

2. The apparatus of claim 1, wherein said reading means comprises at least two light-sensitive cells arranged to correspondingly coincide in position with a first light indication and a second light indication, said light indications being displayed on a display panel of said receiver to visually indicate the vessel's position right and left of said preselected course.

3. The apparatus of claim 2, wherein said light-sensitive cells comprise photocells, said photocells being mounted within a housing adapted to be removably positioned against said display panel of said receiver.

4. The apparatus of claim 1, wherein said reading means comprises at least four light-sensitive cells linearly arranged to correspondingly coincide in position with a first, a second, a third, and a fourth light indication position on said receiver display panel whereby simultaneous lighting of the second and third light indications indicates that the vessel is on course, lighting of either the first or the second light singley indicates that the vessel is off course to the left and lighting of either the third or the fourth light indication indicates that the vessel is off course to the right.

5. The apparatus of claim 4, wherein said light-sensitive cells comprise photocells, said photocells being mounted within a housing adapted to be removably positioned against said display panel of said receiver.

6. The apparatus of claim 1, wherein said means for applying course-control signals comprises at least three magnetic coils arranged with a first coil being centrally positioned relative to a second right coil and a third left coil, said coils being adapted to be removably connected to a compass of said auto pilot.

7. The apparatus of claim 6, wherein said coils are mounted to a flexible base.

8. The apparatus of claim 6, wherein said central coil includes means for adjusting the magnetic strength thereof.

9. The apparatus of claim 1, wherein said converting means comprises an exclusive OR gate having two input legs and one output leg, said input legs being electronically connected to the output of said reading means, one input leg of said OR gate being connected to a first input leg of a first AND gate, the output of said OR gate being connected to a second input leg of said first AND gate, the output of said first AND gate being connected to a first magnetic coil of said signal-applying means, the other input leg of said OR gate being connected to a first input leg of a second AND gate, the output of said OR gate being connected to a second input leg of said second AND gate, the output of said second AND gate being connected to a second magnetic coil of said signal-applying means.

10. The apparatus of claim 9, including a third magnetic coil interposed between said first and said second magnetic coils, said coils being mounted on a base adapted to be attached to a compass of said auto pilot, said third coil being directly connected to a source of electric power.

11. The apparatus of claim 10, wherein said third coil includes means for adjusting the magnetic strength thereof.

12. The apparatus of claim 11, wherein said magnetic-strength adjusting means comprises a potentiometer.

13. The apparatus of claim 1, including means for indicating when the vessel is off course by a predetermined amount and the off course condition is not being corrected by said steering apparatus.

14. The apparatus of claim 13, wherein said off course indicating means comprises an audible alarm system which is activated by said reading means.

15. The apparatus of claim 14, including a logic circuit interposed between said alarm system and said reading means, said logic circuit converting readings from said reading means into signals activating said alarm system.

16. The apparatus of claim 1, wherein said course control signals include a first signal whereby the vessel is steered in a direction from left to right in a direction toward said preselected course direction, a second signal whereby the vessel is steered in a direction from right to left in a direction toward said preselected course direction and a third course control signal whereby the vessel is steered in a direction substantially coincident with said preselected course direction.

17. The apparatus of claim 16, including a first magnetic coil activated by said right-to-left steering direction signal and a second magnetic coil activated by said left-to-right steering direction signal and a third always activated magnetic coil positioned between said first and said second magnetic coil, said coils comprising said means for applying course-control signals to said auto pilot.

18. Apparatus for steering a vessel along a preselected course, said apparatus being adapted to interface with a LORAN C receiver and an auto pilot, comprising:

means for reading the vessel's position relative to said preselected course, said vessel position being determined and indicated by said receiver, said reading means comprising at least two voltage-sensitive sensors arranged to correspondingly coincide in position with a first liquid crystal diode display and a second liquid crystal diode display on said receiver, said diode displays visually indicating the vessel's position left and right of said preselected course;

means for applying course control signals to said auto pilot;

means for converting said reading of the vessel's position into said course control signals; and, means for supplying a source of electric power to said reading means, to said means for supplying control signals, and to said converting means.

19. The apparatus of claim 18, wherein each of said voltage-sensitive sensors comprise a pair of spaced electrodes mounted within a housing adapted to be removably positioned against said display panel of said receiver.

20. Apparatus for steering a vessel along a preselected course, said apparatus being adapted to interface with a LORAN C receiver and with an auto pilot, comprising:

means for reading the vessel's position relative to said preselected course, said vessel position being determined and indicated by said receiver, said reading means comprising at least four voltage-sensitive sensors linearly arranged to correspondingly coincide in position with a first, a second, a third, and a fourth liquid crystal diode display on said receiver whereby simultaneous displays from said second and third diodes indicates that the vessel is on course, a display from said first or second diode indicates that the vessel is off course to the left and a display from the third or fourth diode indicates that the vessel is off course to the right;

means for applying course control signals to said auto pilot;

means for converting said reading of the vessel's position into said course control signals; and, means for supplying a source of electric power to said reading means, to said means for supplying control signals, and to said converting means.

21. The apparatus of claim 20, wherein said voltage-sensitive sensors each comprise a pair of spaced electrodes mounted within a housing adapted to be removably positioned against said display panel of said receiver.

* * * * *